United States Patent
Tonegawa

(10) Patent No.: US 7,693,946 B2
(45) Date of Patent: Apr. 6, 2010

(54) COMMUNICATION APPARATUS AND METHOD OF CONTROLLING SAME

(75) Inventor: Nobuyuki Tonegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1595 days.

(21) Appl. No.: 10/943,867

(22) Filed: Sep. 20, 2004

(65) Prior Publication Data
US 2005/0071500 A1   Mar. 31, 2005

(30) Foreign Application Priority Data
Sep. 25, 2003 (JP) ............... 2003-333447

(51) Int. Cl.
*G06F 15/16* (2006.01)
(52) U.S. Cl. .................... 709/206; 790/246
(58) Field of Classification Search .......... 709/206, 709/207
See application file for complete search history.

(56) References Cited

U.S. PATENT DOCUMENTS

| | | | |
|---|---|---|---|
| 6,898,623 | B1 | 5/2005 | Williams et al. |
| 2001/0013056 | A1* | 8/2001 | Mori et al. ............. 709/206 |
| 2002/0143883 | A1* | 10/2002 | Miyake et al. ............. 709/206 |
| 2005/0225809 | A1 | 10/2005 | Tonegawa ............... 358/402 |

FOREIGN PATENT DOCUMENTS

| | | |
|---|---|---|
| EP | 0 880 268 | 5/1998 |
| JP | 2002-324035 | 11/2002 |
| JP | 2003-233558 | 8/2003 |
| JP | 2002-24111 | 11/2006 |
| WO | WO 03/067440 | 8/2003 |

* cited by examiner

*Primary Examiner*—Vivek Srivastava
*Assistant Examiner*—Xiang Yu
(74) *Attorney, Agent, or Firm*—Fitzpatrick, Cella, Harper & Scinto

(57) ABSTRACT

Disclosed is a communication apparatus in which it is possible to change the size of data transmitted at one time, the data size being changed to one size in case of transmission of e-mail via a mail server and to different size in case of transmission that is not performed via a mail server. E-mail data having image data as an attached file is generated and it is determined whether a predetermined server will intervene when e-mail is transmitted to a transmission destination. When it has been decided that the destination will be a mail server, it is determined whether the e-mail data has exceeded a prescribed size. E-mail data for which it has been determined that the prescribed size is exceeded is divided into a plurality of segments and then the e-mail data is transmitted to destination decided.

16 Claims, 13 Drawing Sheets

COMMUNICATION APPARATUS AND METHOD OF CONTROLLING SAME

FIELD OF THE INVENTION

This invention relates to a communication apparatus and to a method of controlling this apparatus. More particularly, the invention relates to a communication apparatus having an e-mail transmission function, and to a method of controlling this apparatus.

BACKGROUND OF THE INVENTION

The popularization of computers and the networking of information have been accompanied by the wide use of e-mail for sending and receiving text information over networks. In addition to the body of mail, which is text information, files having various formats can be attached to e-mail, and there has been proposed an Internet fax (referred to also as "IFAX" below) in which images can be sent and received by attaching an image file having a format (TIFF: Tagged Image File Format) defined as an attached file.

According to RFC2532 (Expanded Facsimile Using Internet Mail) issued by the Internet technology development group IETF (Internet Engineering Task Force), which is engaged in standardizing Internet technology, there has been proposed a so-called "full mode" for Internet fax, wherein when mail to which a TIFF file transmitted by a transmitter has been attached is received normally by a receiver, the fact that reception proceeded normally is reported from the receiver to the transmitter in the form of e-mail.

When an e-mail server handles e-mail having a large data size, processing speed declines sharply and the distribution of other e-mail is impeded. In a worst-case scenario, the mail server goes down and the e-mail system can cease functioning.

For this reason, a technique whereby e-mail data is divided into a plurality of segments at the time of transmission has been proposed, as described in the specification of Japanese Patent Application Laid-Open No. 2002-324035.

Further, the specification of WO03-067440 (corresponding to Japanese Patent Application Laid-Open No. 2003-233558) proposes providing a switch whereby e-mail is switched between transmission via a SMTP server or transmission directly to the destination, with the changeover being performed for every transmission destination that has been set in an address book.

Because there is an increase in processing load (a decline in processing speed) when an e-mail file having a file attachment of large data size is sent and received, as mentioned above, there are cases where the mail server imposes a limitation upon the data size of e-mail. A problem which arises in such cases is that image data of large data size cannot be transmitted. In addition, often the limitation on data size differs from one mail server to another.

Further, in a case where the transmission destination is in an Internet environment in which a firewall or the like exists along the transmission path, transmission via a mail server is required. However, in the case of a local environment in which the transmission destination exists on the same network, transmission via a mail server is unnecessary. In such case, therefore, it is not necessary to abide by a data size that is capable of being accepted by the mail server.

SUMMARY OF THE INVENTION

Accordingly, an object of the present invention is to make it possible to change the size of data transmitted at one time in a communication apparatus that transmits e-mail, the data size being changed to one size in case of transmission of e-mail via a mail server and to another size in case of transmission that is not performed via a mail server.

Another object of the present invention is to provide a method of controlling a communication apparatus that is capable of changing the size of data transmitted at one time, the data size being changed to one size in case of transmission of e-mail via a mail server and to another size in case of transmission that is not performed via a mail server.

According to the present invention, the foregoing objects are attained by providing a communication apparatus having transmission unit, which transmits e-mail data, comprising: e-mail data generating unit, which generates e-mail data; setting unit, which sets whether or not a mail server will intervene when the e-mail data generated by the e-mail data generating unit is transmitted; dividing unit, which divides the e-mail data generated by the e-mail data generating unit if the e-mail data exceeds a predetermined size; and controller, which exercises control in such a manner that if the e-mail data generated by the e-mail data generating unit exceeds the predetermined size in a case where intervention by the mail server has been set by the setting unit, then the e-mail data is transmitted by the transmission unit upon being divided by the dividing unit, and such that the e-mail data is transmitted by the transmission unit without being divided by the dividing unit even if the e-mail data generated by the e-mail data generating unit exceeds the predetermined size in a case where intervention by the mail server has not been set by the setting unit.

According to the above arrangement, if the size of e-mail data exceeds a prescribed size, the data is transmitted upon being divided into a plurality of segments in a case where transmission is via a mail server. If transmission is not performed via a mail server, then the e-mail data is transmitted directly irrespective of its size.

Accordingly, the size of data transmitted at one time can be changed between one size in a case where e-mail is transmitted via a mail server and a different size in a case where e-mail is not transmitted via a mail server. In a case where a mail server is made to intervene, therefore, the inconvenience of no longer being able to transmit mail owing to a limitation imposed by the mail server is eliminated. In a case where there is no intervention by a mail server, on the other hand, mail can be transmitted all in one batch.

According to another aspect of the present invention, the foregoing objects are attained by providing a communication apparatus having transmission unit, which transmits e-mail data, comprising: e-mail data generating unit, which generates e-mail data; setting unit, which sets whether or not a mail server will intervene when the e-mail data generated by the e-mail data generating unit is transmitted; first registration unit, which registers a data-size limit value in a case where intervention by the mail server has been set by the setting unit; second registration unit, which registers a data-size limit value in a case where intervention by the mail server has not been set by the setting unit; dividing unit, which divides the e-mail data generated by the e-mail data generating unit if the data size of this e-mail data exceeds the limit value registered by the first registration unit or the limit value registered by the second registration unit; and controller, which exercises control in such a manner that when the e-mail data generated by the e-mail data generating unit exceeds the limit value, which has been registered by the first registration unit, in a case where intervention by the mail server has been set by the setting unit, the e-mail data is transmitted by the transmission unit upon being divided by the dividing unit, and such that when the e-mail data generated by the e-mail data generating unit exceeds the limit value, which has been registered by the second registration unit, in a case where intervention by the mail server has not been set by the setting unit, the e-mail data is transmitted by the transmission unit upon being divided by the dividing unit.

If this arrangement is adopted, e-mail data is transmitted upon being divided in accordance with different limit values, namely one limit value in a case where a mail server is made to intervene and a different limit value in a case where there is no intervention by a mail server.

Accordingly, the size of data transmitted at one time can be changed between one size in a case where e-mail is transmitted via a mail server and another size in a case where e-mail is not transmitted via a mail server. In a case where a mail server is made to intervene, therefore, the inconvenience of no longer being able to transmit mail owing to a limitation imposed by the mail server is eliminated. In a case where there is no intervention by a mail server, on the other hand, it becomes possible to transmit e-mail data of a data size greater than that in a case where a mail server is made to intervene.

According to another aspect of the present invention, the foregoing objects are attained by providing a communication apparatus having transmission unit, which transmits e-mail data, comprising: e-mail data generating unit, which generates e-mail data; transmission-destination information registration unit, which registers a data-size limit value on a per-transmission-destination basis; and dividing unit which, if the data size of e-mail data generated by the e-mail data generating unit exceeds a limit value that has been registered in the transmission-destination information registration unit with respect to a transmission destination to which a transmission is to be made by the transmission unit, is for dividing the e-mail data in accordance with this limit value.

If this arrangement is adopted, e-mail data is transmitted upon being divided in accordance with a limit value registered for every transmission destination.

Accordingly, since e-mail data is capable of being transmitted upon being divided in accordance with a limit value that differs for every transmission destination, e-mail data of an optimum size that is in accordance with the conditions of every transmission information can be transmitted.

The apparatus may further comprise transmission-destination information registration unit, which registers various information including whether or not a mail server will intervene, on a per-transmission-destination basis, and the setting unit may perform the setting in accordance with content that has been registered in the transmission-destination information registration unit.

The transmission-destination information registration unit may register the predetermined size on a per-transmission-destination basis, and the dividing unit may divide the e-mail data by determining, after a transmission destination has been decided, whether the size registered for this transmission destination in the transmission-destination information registration unit has been exceeded the predetermined size.

The transmission-destination information registration unit may register, on a per-transmission-destination basis, whether the e-mail data will be transmitted in a first transmission mode, in which confirmation of delivery is performed, or in a second transmission mode, in which confirmation of delivery is not performed, and when it has been determined that the e-mail data exceeds the predetermined size, the controller may suspend transmission of the e-mail data if the mode for transmitting the data to the transmission destination is the first transmission mode.

The e-mail data generating unit may generate e-mail data having image data as an attached file.

It should be noted that the objects of the invention are also attained by a method of controlling a communication apparatus corresponding to the above-described communication apparatus, a computer program whereby the method of controlling the communication apparatus is implemented by a computer, and a computer-readable storage medium that stores this computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings. Note that each of the elements in the following embodiments are not intended to limit the scope of the invention but are described only as an example.

First Embodiment

Network Configuration

Figure 1:
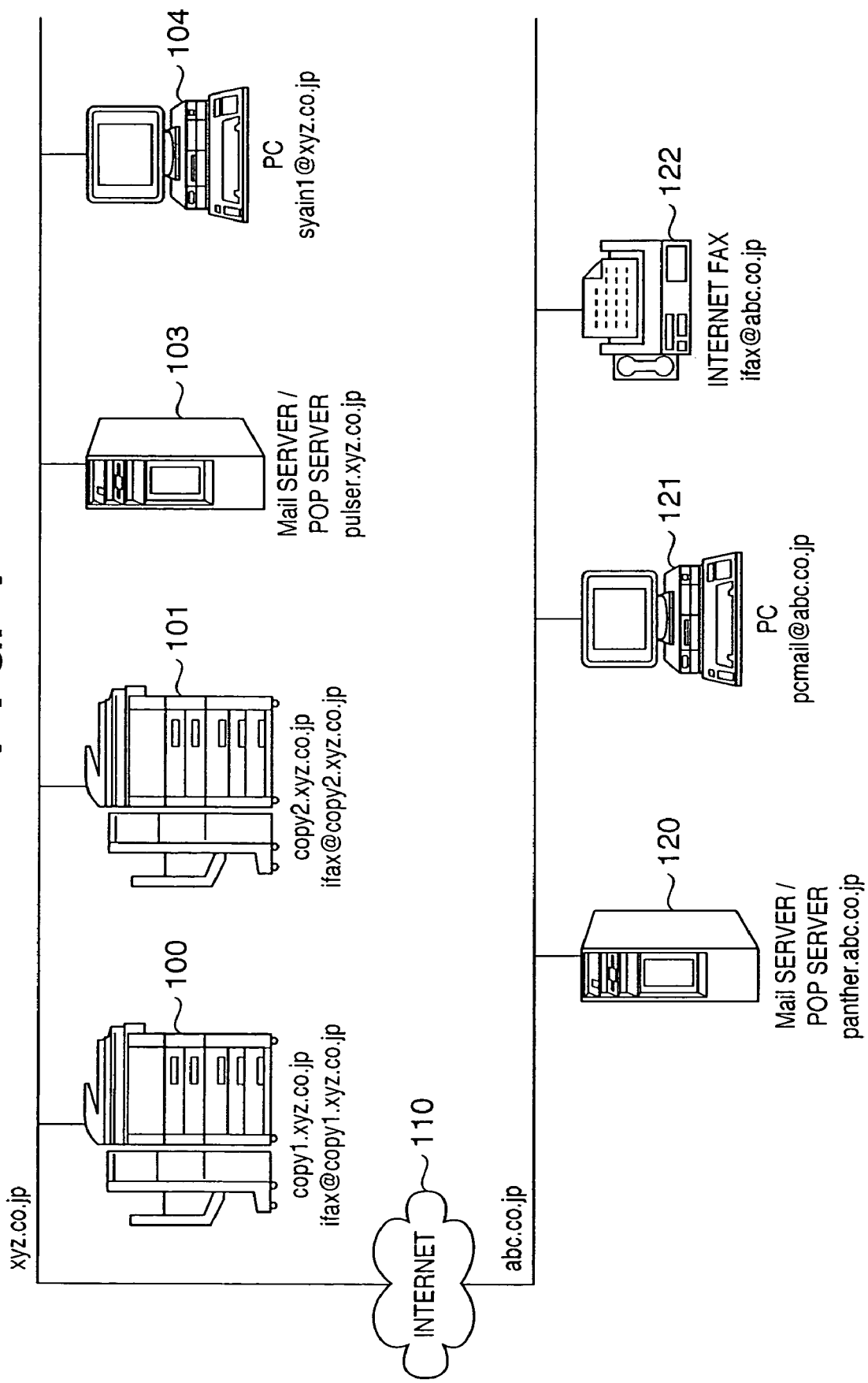
FIG. 1 is a diagram illustrating a network connection environment that includes an embodiment of a communication apparatus according to the present invention.

FIG. 1 is a diagram illustrating a network connection environment that includes a first embodiment of a communication apparatus according to the present invention.

MFPs (Multi-Function Peripherals) 100 and 101 are multi-function copiers (also referred to simply as copiers below) equipped with a scanner and a printer so that they may implement a copy function, FAX transceive function and printer function for printing data that has been created on a computer.

The MFPs 100 and 101 are connected to a network identified by a domain name xyz.co.jp. The MFPs are connected to a plurality of computers and network devices such as a mail server/POP server 103 and personal computer 104 via the network.

The network is further connected to the Internet 110, which has global extent, and is also connected via the Internet 110 to a network, which is identified by the domain name abc.co.jp, to which a mail server/POP server 120, personal computer 121 and Internet fax 122 are connected.

A host name copy1.xyz.co.jp and a device e-mail address ifax@copy1.xyz.co.jp are assigned to the MFP 100, and a host name copy2.xyz.co.jp and a device e-mail address ifax@copy2.xyz.co.jp are assigned to the MFP 101.

General-purpose e-mail software is installed in the personal computer 104 and a mail address syain1@xyz.co.jp is assigned to this personal computer.

The mail server/POP server 103 is a server equipped with both of functions of the mail server and the POP server, and the mail server/POP server 120 also has similar functions.

In a case where e-mail is transmitted from the address syain1@xyz.co.jp of personal computer 104 to the destination at address pcmail@abc.co.jp of personal computer 121, the e-mail data that has been created by the personal computer 104 is sent to the mail server 103 according to the SMTP (Simple Mail Transfer Protocol) and then is sent from the mail server 102 to the mail server 120 via the Internet 110 in accordance with the SMTP protocol.

General-purpose e-mail software has been installed in the personal computer 121 as well. Using the POP3 (Post Office Protocol—Version 3) protocol, the personal computer 121 checks with the mail server 120 at regular intervals to determine whether mail has been delivered. If mail has been delivered, then the personal computer 121 receives the mail data.

In a case where e-mail is sent from the address pcmail@abc.co.jp of personal computer 121 to the address syain1.@xyz.co.jp of personal computer 104, data that has been created by the personal computer 121 is sent from the mail server 120 to the mail server 103 via the Internet over a route that is the reverse of that described above.

The personal computer 104 operates so as to acquire mail data that has been delivered to the mail server 103 using the POP3 protocol.

The MFPs 100 and 101 have an e-mail transmit mode and an IFAX transmit mode as their transmission modes. In the e-mail transmit mode, an image that has been received by a FAX or IFAX reception function and a monochrome/color image that has been read by a scanner are transmitted on the assumption that they will be sent to an ordinary e-mail address. In the IFAX transmit mode, it is assumed that transmission will be to a device that is compliant with the IFAX standard.

The SMTP protocol and POP3 protocol are used as transmit and receive protocols, respectively, and implement operation similar to send/receive described above.

In the e-mail transmit mode, images in the JPEG format are transmitted. For example, when the MFP 100 or 101 transmits a color image in the JPEG format to the address syain1.@xyz.co.jp of personal computer 104, which is a client personal computer, in the form of e-mail, then the personal computer 104 receives this e-mail and is capable of displaying the attached JPEG image by a general-purpose image viewer that has been installed.

In the IFAX transmit mode, on the other hand, an image in the TIFF format compliant with RFC2301 is transmitted. For example, an image in the TIFF format is sent and received by the MFP 100, MFP 101 and Internet fax 122 in accordance with the IFAX standard.

(Functional Structure of MFP)

Figure 2:
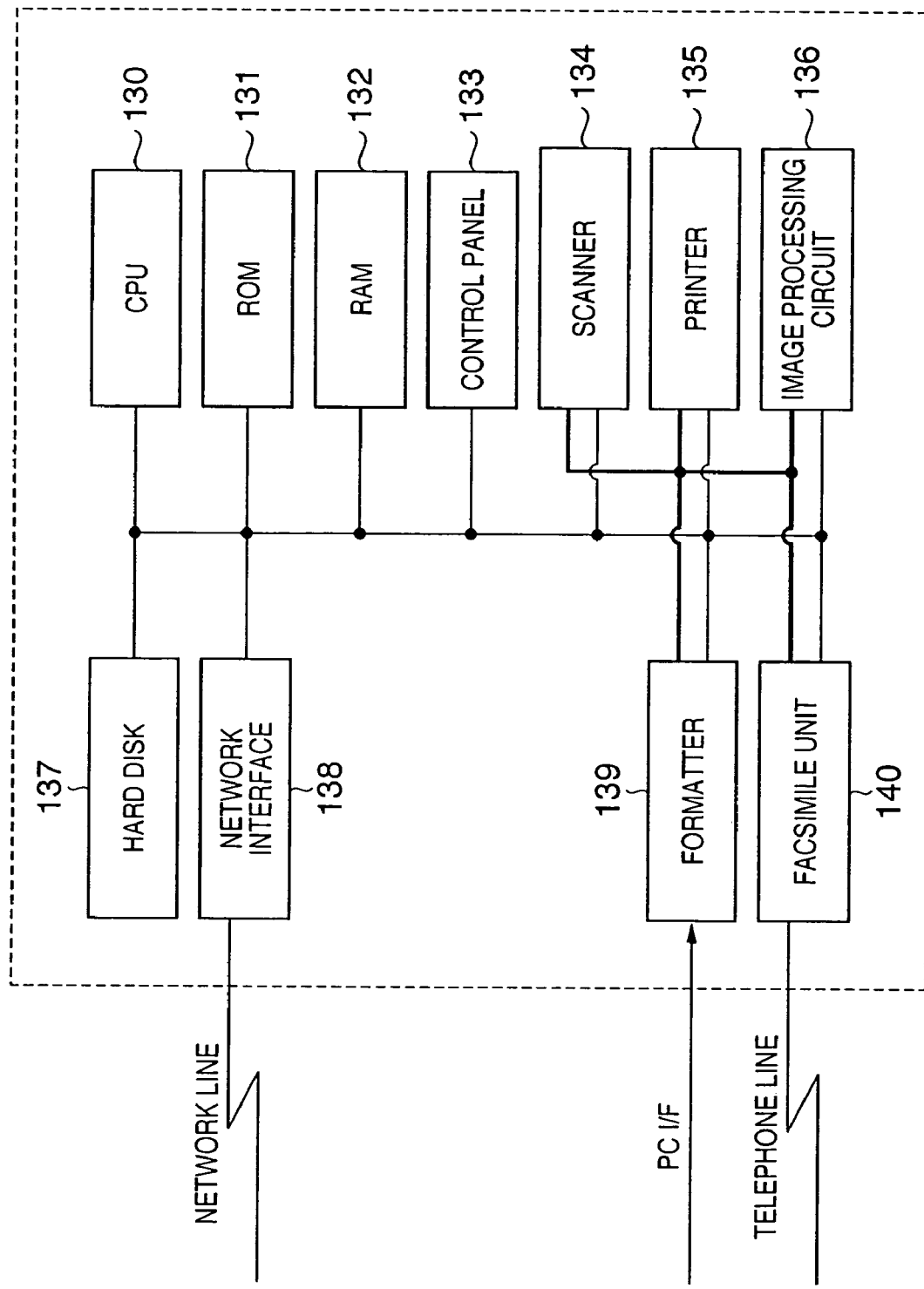
FIG. 2 is a block diagram illustrating the structure of an MFP (Multi-Function Peripheral)

FIG. 2 is a block diagram illustrating the structure of the MFP 100.

A CPU 130 is a controller for executing control of the overall system, utilizing the memory area of a RAM 132, in accordance with a program that has been stored in a ROM 131. The components constituting the MFP 100 and the CPU are connected by a bus.

A control panel 133 has an LCD panel and hardware keys such as a start key and numeric keypad. Soft keys are displayed on the LCD. The control panel 133 senses that a finger of the user has touched a soft key and executes the operation intended by the user.

A scanner 134 converts the image data of a document, which has been placed at a prescribed position, to electrical data by means of an optoelectronic conversion.

The operation of the scanner 134 will now be described in detail. When a document is transported to and placed on a document glass by a document feeder, a lamp is lit and movement of a scanner unit is started to expose and scan the document. Reflected light from the document is guided to a CCD image sensor by mirrors and lenses and is converted to an electrical signal by the image sensor. The electrical signal is converted to digital data by an A/D converting circuit. At the end of the document reading operation, the document on the document glass is ejected.

A printer unit 135 prints the electrical image data on printing paper.

As for the details of operation of printer unit 135, a laser beam conforming to the electrical image data is emitted from a light-emitting unit and illuminates a photosensitive drum, whereby a latent image conforming to the laser light is formed on the photosensitive drum.

A developer is affixed by a developing unit to the portions of the latent image that has been formed on the photosensitive drum, printing paper is fed from a paper-feed cassette and transported to a transfer unit at a timing synchronized to the start of illumination by the laser beam, and the developer affixed to the photosensitive drum is transferred to the printing paper.

The printing paper carrying the developer is transported to a fixing unit, whereby the developer is fixed to the printing paper by heat and pressure applied by the fixed unit. The printing paper that has traversed the fixing unit is ejected by ejection rollers and then is sorted by a sorter by being sent to and received in respective ones of paper bins.

An image processing circuit 136, which comprises a large-capacity image memory, an image rotating circuit, a resolution scaling circuit and an MH, MR, MMR, JBIG or JPEG coder/decoder circuit, executes various image processing such as shading, trimming and masking.

A hard disk 137 is a large-capacity recording medium connected via an interface such as an SCSI or USB. The recording medium may be a magneto-optic disk or the like and not just a hard disk.

A network interface 138 implements a network link for connecting to a network line such as Ethernet or token ring typified by 10BASE-T or 100BASE-T.

A formatter 139, which is equipped with a personal computer interface circuit such as a parallel interface compliant with IEEE 1284 or a USB, executes rendering processing for creating image data based upon data described in PDL (Page Description Language) transmitted from a personal computer and received by the personal computer interface circuit or network interface circuit. The image created is subjected to image processing by the image processing circuit 136 and is then printed by the printer 135.

A facsimile unit 140 is connected to a telephone line and acts as a facsimile interface constituted by a circuit such as an NCU (Network Control unit) or MODEM (Modulator/DE-Modulator).

The operation of the facsimile unit 140 will now be described in detail. Image data that has been read by the scanner 134 is subjected to image processing by the image processing circuit 136 and then transmitted to another facsimile machine via the telephone line. Alternatively, data that has been transmitted from another facsimile machine is subjected to image processing by the image processing circuit 136 and then printed by the printer 135.

The scanner 134, printer 135, image processing circuit 136, formatter 139 and facsimile unit 140 are connected to one another by a high-speed video bus separately of the CPU bus for sending and receiving data to and from the CPU 130. Thus the arrangement is such that image data can be transferred at high speed.

The copy function is implemented by performing image processing on the image scanned via the scanner 134 by the image processing circuit 136, and executing printing by the printer 135.

The e-mail transmit function for attaching image data read by the scanner 134 to e-mail and then transmitting the e-mail over the network from the network interface, or the IFAX function for creating an image that is in accordance with RFC2301 by the image processing circuit 136 and sending/receiving data according to the e-mail protocol, is implemented by the MFP 100.

(MFP Program Structure)

Figure 3:
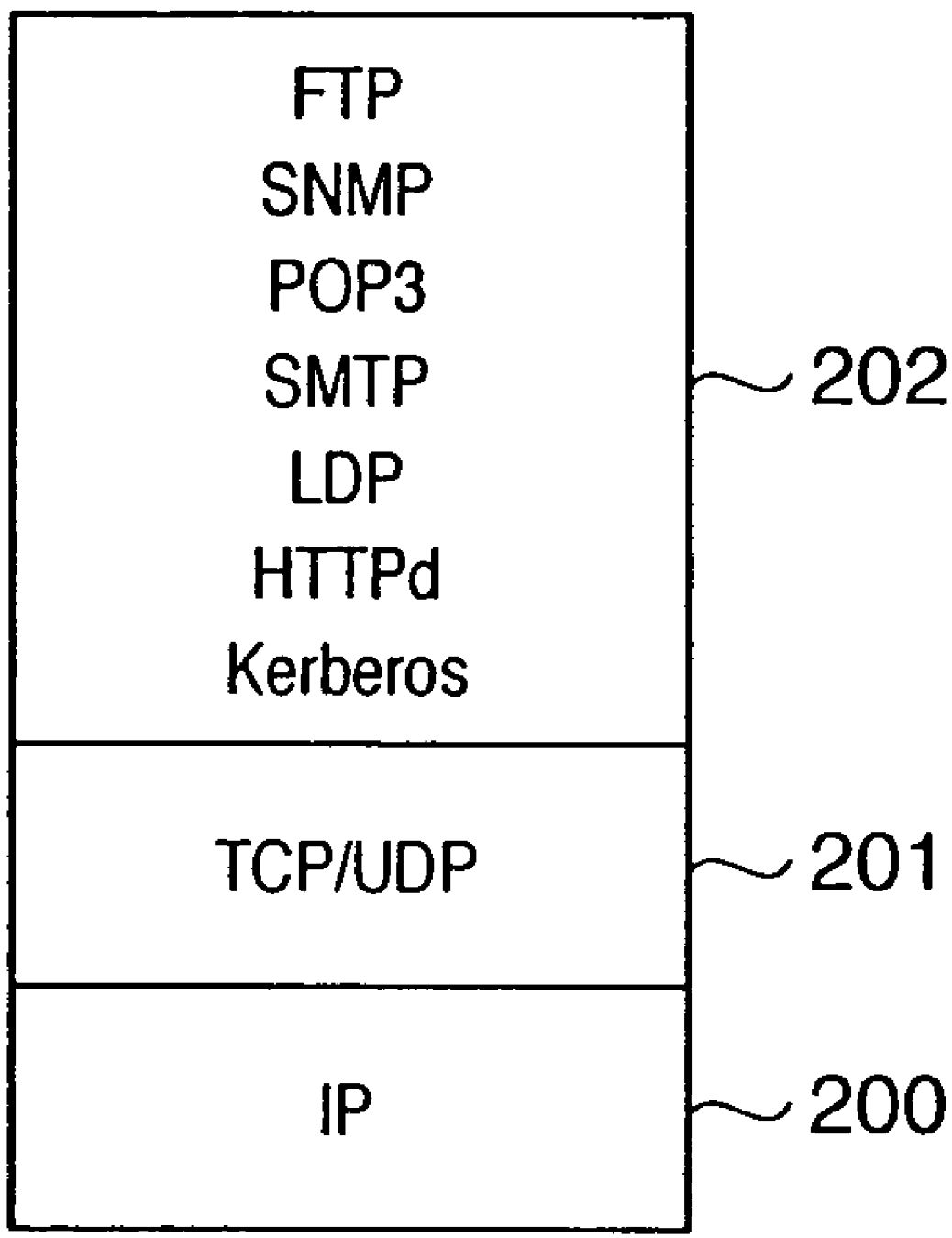
FIG. 3 is a diagram useful in describing the structure of a program stored in the MFP.

FIG. 3 is a diagram useful in describing the structure of the program stored in the MFP 100.

The structure of the program is classified broadly into three layers, namely IP (Internet Protocol) 200, TCP (Transmission Control Protocol)/UDP (User Datagram Protocol) 201 and an application-layer program 202.

IP 200 is a protocol layer for providing a service that delivers messages from an originating host to a destination host while cooperating with a repeater node such as a router. IP 200 implements a routing function for managing the address of an originating source that transmits a message and the address of a destination that receives a message, and manages by which route a message is delivered to the destination host in a network in accordance with address information.

TCP/UDP 201 is a transport layer for providing a service that delivers a message from an originating application process to a receiving application process. TCP is a connection-type service that assures communication of high reliability, while UDP is a connectionless-type service that does not assure reliability.

The application-layer protocol 202 specifies a plurality of protocols. These protocols include FTP (File Transfer Protocol), which is a file transfer service, SNMP (Simple Network Management Protocol), which is a network management protocol, LPD (Line Printer Daemon), which is a protocol for printing by a printer, HTTP (HyperText Transport Protocol), which is the protocol of the WWW (World Wide Web), SMTP (Simple Mail Transfer Protocol), which is a protocol for sending and receiving e-mail, and POP3 (Post Office Protocol—Version 3), which is a protocol for downloading e-mail. A Kerberos authentication program specified by RFC 1510 also is installed.

There are two types of IFAX transmission, namely simple mode transmission and full mode transmission, as mentioned above. As will be described later, it is possible to set whether transmission is in the simple mode or full mode for every destination in an address book.

(Operation at time of transmission: MFP→Internet Fax 122)

Figure 4:
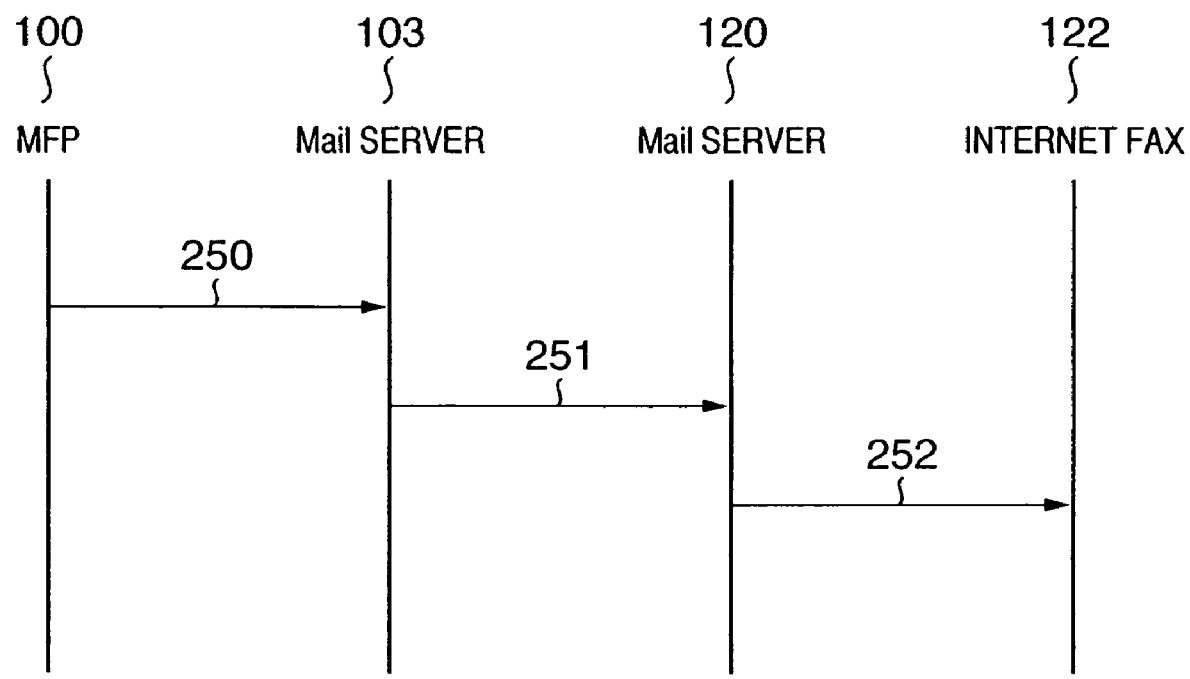
FIG. 4 is a sequence diagram illustrating operation when a transmission is made from the MFP in a simple mode.

FIG. 4 is a sequence diagram illustrating operation when a transmission is made from MFP 100 to Internet fax 122 in the simple mode.

In this case it is necessary to transmit to the destination (the final destination) via the Internet 110. In a case where a firewall or the like (not shown) is present between the MFP 100 and Internet fax 122, a direct transmission to the destination is not possible. E-mail that has been created by the MFP 100, therefore, is sent via the mail server 103 and mail server 120.

Initially, e-mail to which image data created by the MFP 100 has been attached is sent from the MFP 100 to the mail server 103 (250).

If communication between the MFP 100 and mail server 103 ends normally, then "--" is registered in the transmission log and in the result of a transmission-result report as information that indicates whether or not the mail has been delivered normally to the destination. Thus, transmission is terminated upon gaining the attention of the transmitting party.

If the e-mail transmission 250 fails, on the other hand, information indicating that an error has occurred is registered in the transmission log and in the result of the transmission-result report and transmission is terminated.

Next, mail the e-mail is sent from the mail server 103 to the mail server 120 via the Internet 110 (251), and the mail data is transferred from the mail server 120 to the Internet fax 122 by e-mail communication within the same network (252).

Figure 5:
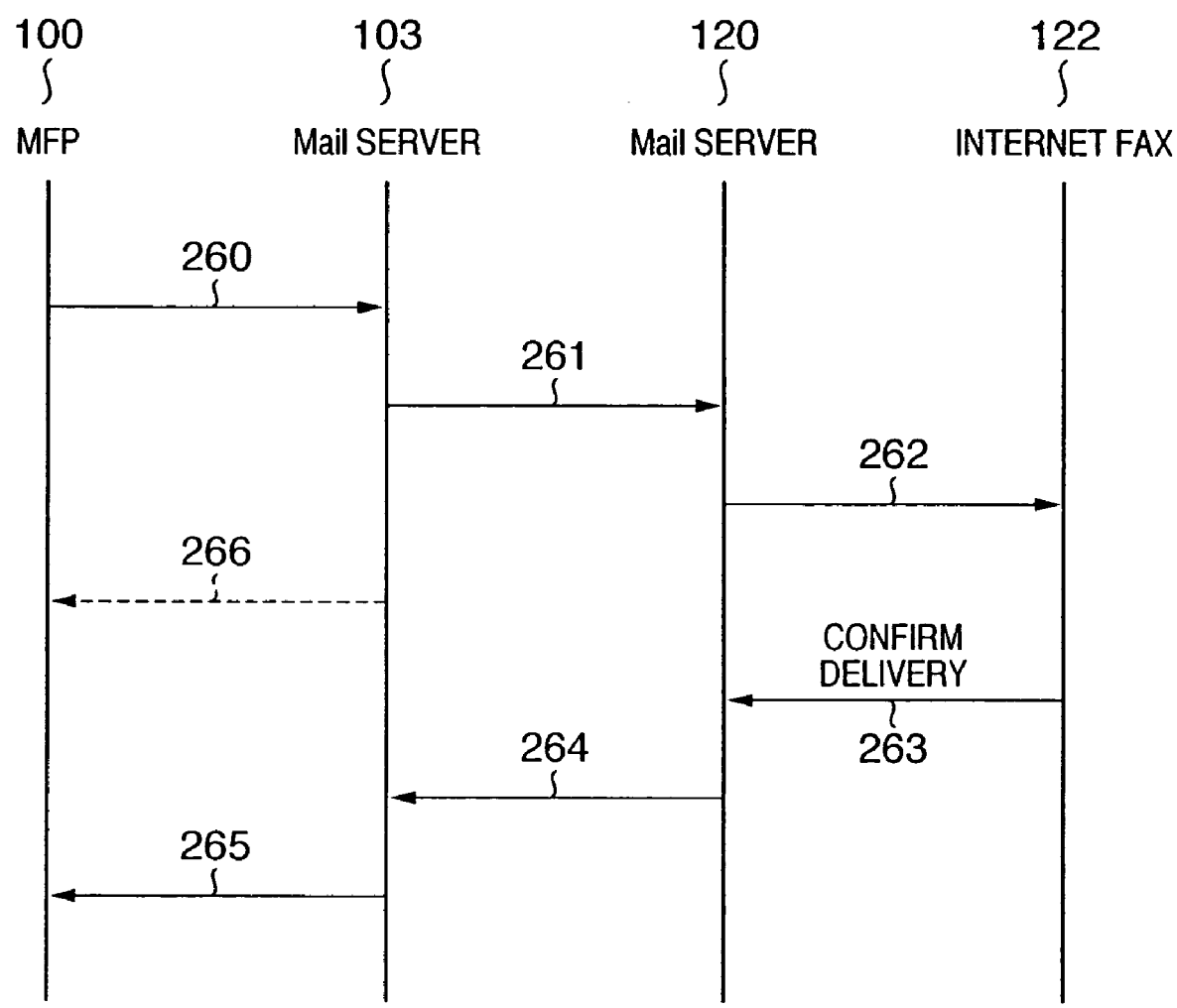
FIG. 5 is a sequence diagram illustrating operation when a transmission is made from the MFP in a full mode.

FIG. 5 is a sequence diagram illustrating operation when a transmission is made from the MFP 100 to the Internet fax 122 in the full mode.

Data requesting confirmation of delivery (MDN: Message Disposition Notification) is assigned to e-mail to which image data created by the MFP 100 has been attached. This is sent from the MFP 100 to the mail server 103 by e-mail (260) and from the mail server 103 to the mail server 120 by mail via the Internet 110 (261), and the mail data is transferred from the mail server 120 to the Internet fax 122 by e-mail (262).

Upon receiving the mail requesting confirmation of delivery, the Internet fax 122 creates MDN e-mail data indicating successful communication if the image could be formed from the received image data normally. If processing could not be executed normally, then the Internet fax 122 creates MDN e-mail data indicating that an error has occurred.

The MDN e-mail data created by the Internet fax 122 is communicated from the Internet fax 122 to the mail server 120 by mail (263), transmitted from the mail server 120 to the mail server 103 via the Internet 110 (264) and transmitted from the mail server 103 to the MFP 100 by mail (265), whereby the MFP 100 of the transmitting party is notified of the result of confirmation of delivery.

Upon receiving confirmation of delivery, the MFP 100 registers "normal" as the result in the transmission log and prints out the transmission-result report.

On the other hand, if after the mail server 103 receives mail from the MFP 100 at 260 the mail transmission 261 to the mail server 120 cannot be executed normally owing to a failure of some kind, then the mail server 103 transmits DSN (Delivery Status Notification) error mail to the MFP 100 (266).

Upon receiving the DSN error mail from the mail server 103, the MFP 100 terminates the transmission operation, registers "error" as the result in the transmission log and prints out a transmission-result report indicating error as the result of transmission.

(Operation at time of transmission: MFP 100→MFP 101)

Figure 6:
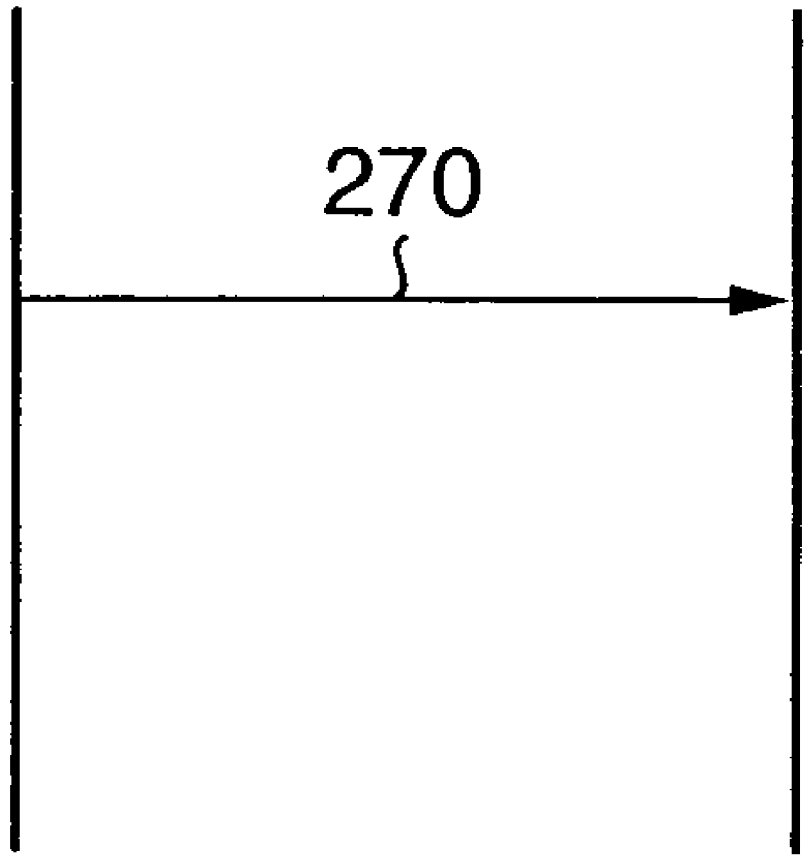
FIG. 6 is a sequence diagram illustrating operation when a transmission is made from one MFP to another MFP in the simple mode.

FIG. 6 is a sequence diagram illustrating operation when a transmission is made from MFP 100 to MFP 101 in the IFAX simple mode.

In this case, since both MFPs are in the same network and no firewall is present between them, e-mail created by the MFP 100 is transmitted directly to the MFP 101 without the intermediary of the mail server 103 (270).

In case of failure of e-mail transmission at 270, "NG" indicating transmission error is registered in the transmission log, the transmission-result report is printed out and the transmission operation is terminated.

Figure 7:
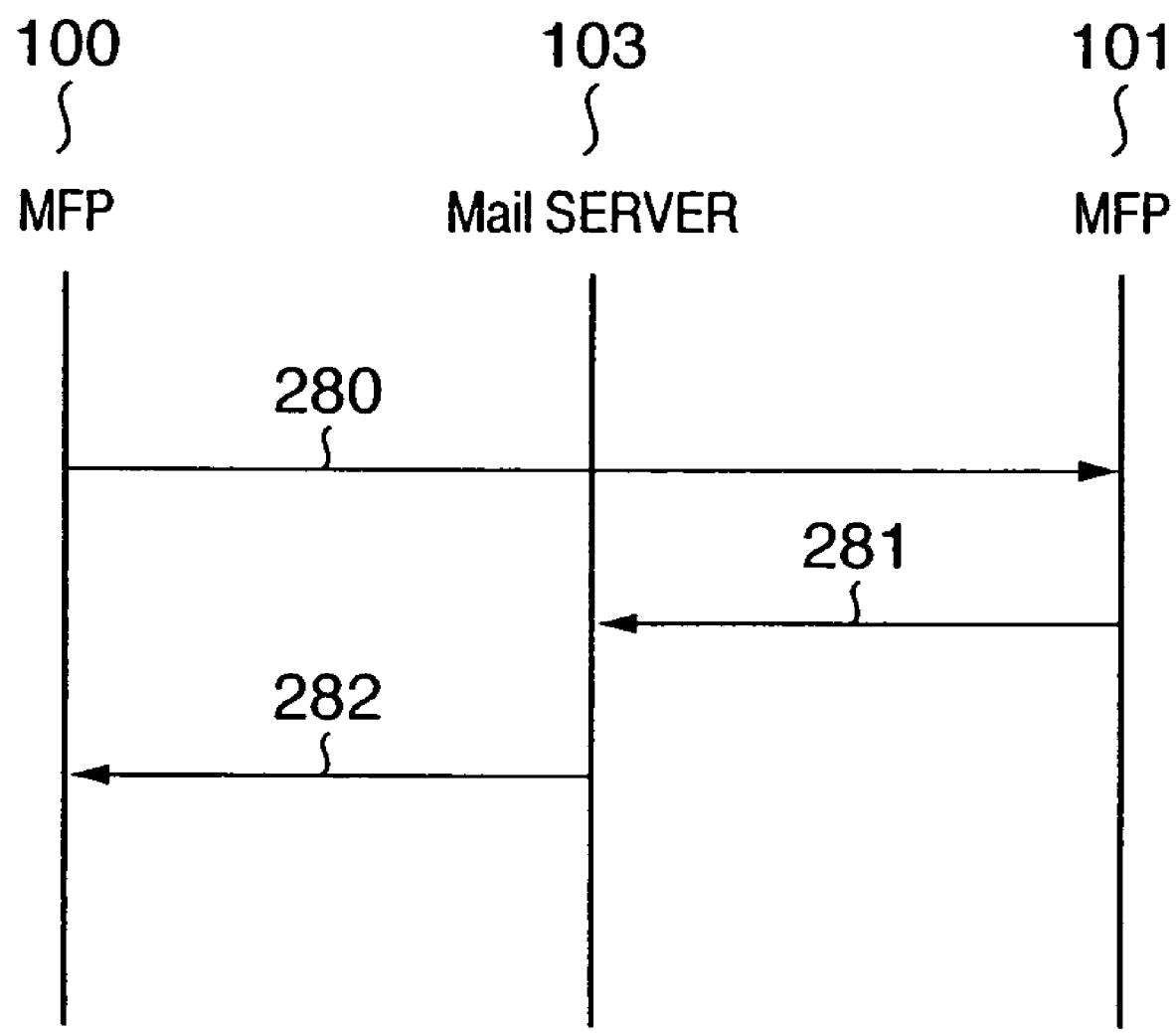
FIG. 7 is a sequence diagram illustrating operation when a transmission is made from one MFP to another MFP in the full mode.

FIG. 7 is a sequence diagram illustrating operation when a transmission is made from MFP 100 to MFP 101 in the IFAX full mode.

Data requesting confirmation of delivery (MDN: Message Disposition Notification) is assigned to e-mail to which image data created by the MFP 100 has been attached. The e-mail is transmitted from the MFP 100 to the MFP 101 directly without the intervention of the mail server 103 (280).

Upon receiving the mail requesting confirmation of delivery, the MFP 101 creates MDN e-mail data indicating successful communication if the image could be formed from the received image data normally. If processing could not be executed normally, then the MFP 101 creates MDN e-mail data indicating that an error has occurred.

The MDN e-mail data created is communicated from the MFP 101 to the mail server 103 by mail (281) and the mail server 103 communicates with the MFP 100 by mail to thereby notify the MFP 100 of the transmitting party of the result of delivery conformation (282).

Upon receiving confirmation of delivery, the MFP 100 registers normal/error as the result in the transmission log and prints out the transmission-result report when the MDN is received.

(Display Screen on Control Panel)

Figure 8:
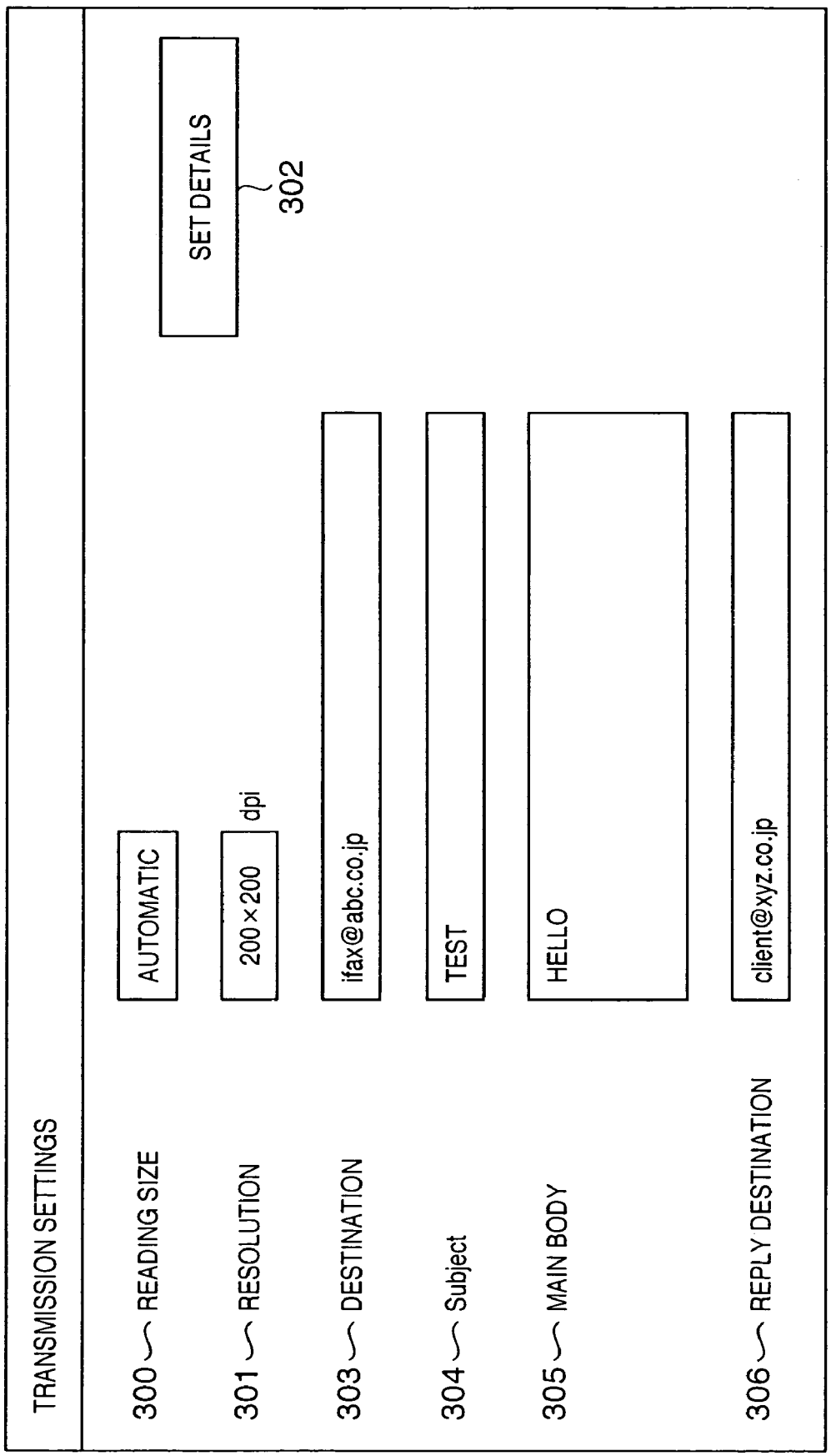
FIG. 8 is a diagram illustrating an example of a transmission set-up screen on a control panel when an image is transmitted.

FIG. 8 is a diagram illustrating an example of a transmission set-up screen on the control panel 133 when an image is transmitted.

A reading size 300 is an area for designating the paper size of the image read by the scanner 134. The designation can be made from among A5, A4, A3, B5, B4 and automatic. Automatic has been set as the default.

Resolution 301 is an area for specifying the resolution of the image read by the scanner 134. Any resolution from among 200×100, 200×200, 200×400, 300×300, 400×400 and 600×600 dpi can be selected. Here 200×200 dpi has been set as the default.

If a details setting button 302 is pressed, a window (not shown) is displayed. The window makes it possible to make various settings, such as density setting at the time of scanning, a designation of document type, double-sided read-in, a designation of imaging of pages continuously and adjustment of image quality and allows each of these values to be set.

Figure 9:
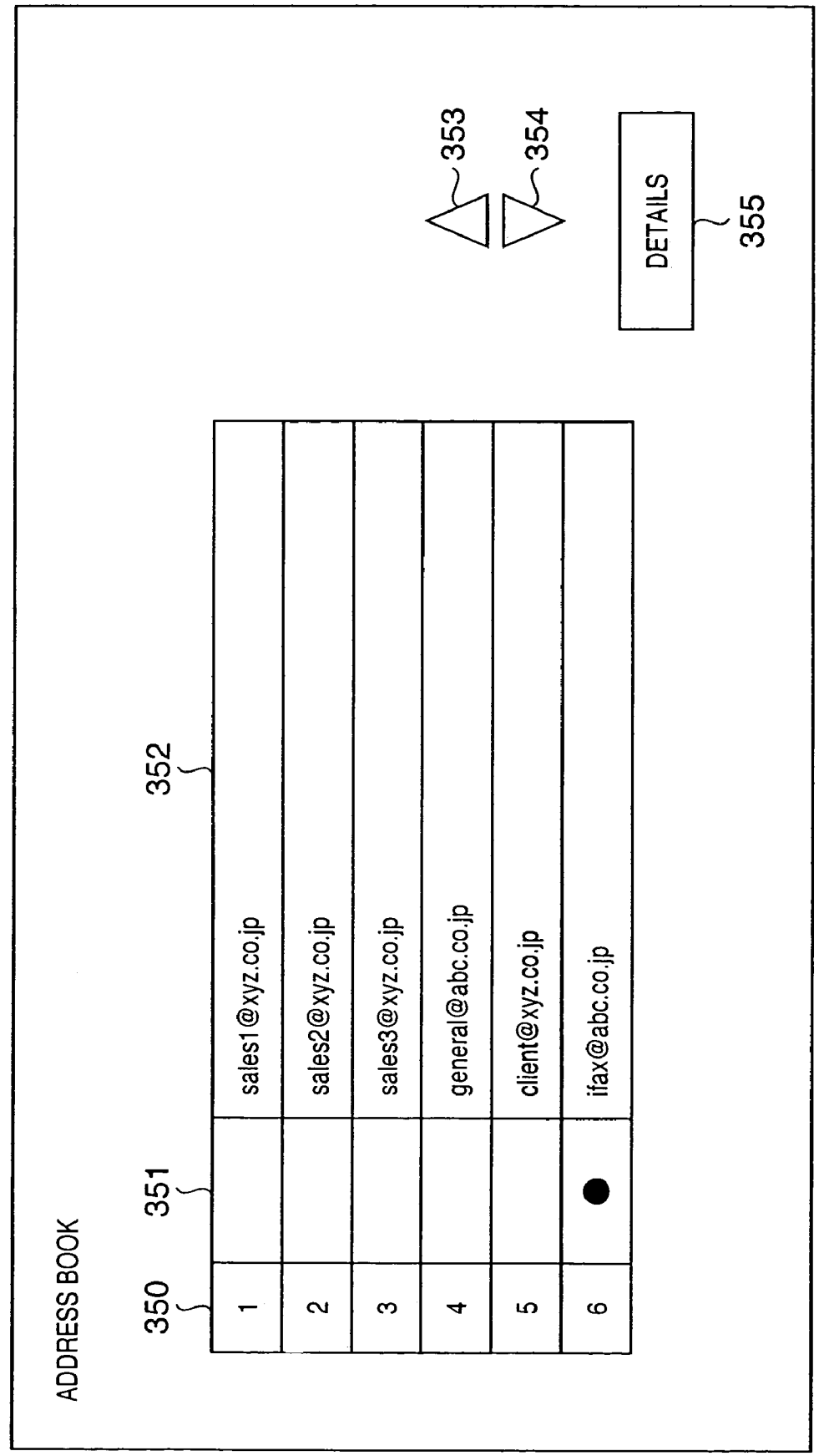
FIG. 9 is a diagram illustrating an example of a screen when an address book is displayed.

Destination 303 is a button for inputting the destination of an e-mail transmission. If this button is pressed, an address book shown in FIG. 9 is displayed. Though this will be described in detail with reference to FIG. 9, here ifax@abc.co.jp of Internet fax 122 has been selected as the transmission destination.

Subject 304 is an area that allows entry of the subject of the e-mail. In the illustrated example, "TEST" has been entered as the subject. Body 305 of the mail is an area in which the body of the e-mail can be entered. In this example, "HELLO" has been entered.

Reply destination 306 is an area for entering an address. Specifically, assume that the user on the receiving side performs a reply operation when mail has been sent from the Internet fax. If the e-mail address of the destination to which the reply is to be sent is set to the e-mail address (e.g., client@xyz.co.jp) that this client normally employs rather than the address of the Internet fax, then this address is entered in area 306. This reply-destination e-mail address can also be entered using the address book.

In a case where the reply-destination e-mail address has been set, it can be so specified that confirmation of delivery is sent to both the e-mail address of this machine (ifax@abc.co.jp) and to the reply-destination e-mail address (client@xyz.co.jp). Accordingly, if the reply-destination e-mail address is set to the mail address that is usually utilized, confirmation of delivery can also be sent to client@xyz.co.jp so that confirmation of delivery can be performed with ease.

(Address Book Display Screen)

FIG. 9 is a diagram illustrating an example of a screen when the address book is displayed. The address book is a database that is capable of storing the mail addresses of a large number of communication devices such as the Internet fax.

The address book is displayed in a table format composed of an address book ID 350, a selection mark 351 and a transmit e-mail mail address 352. The address book can be scrolled up and down using keys 353 and 354, respectively.

At the time of transmission, a plurality of addresses can be selected from the address book and a circle mark will be displayed as the selection mark 351 opposite the selected address. In the illustrated example, ifax@abc.co.jp of ID No. 6 in the address book has been selected as a destination.

A details key 355 is a key that causes the display of detailed information that has been registered in regard to the selected address. The detailed information will be described with reference to FIG. 10.

Figure 10:
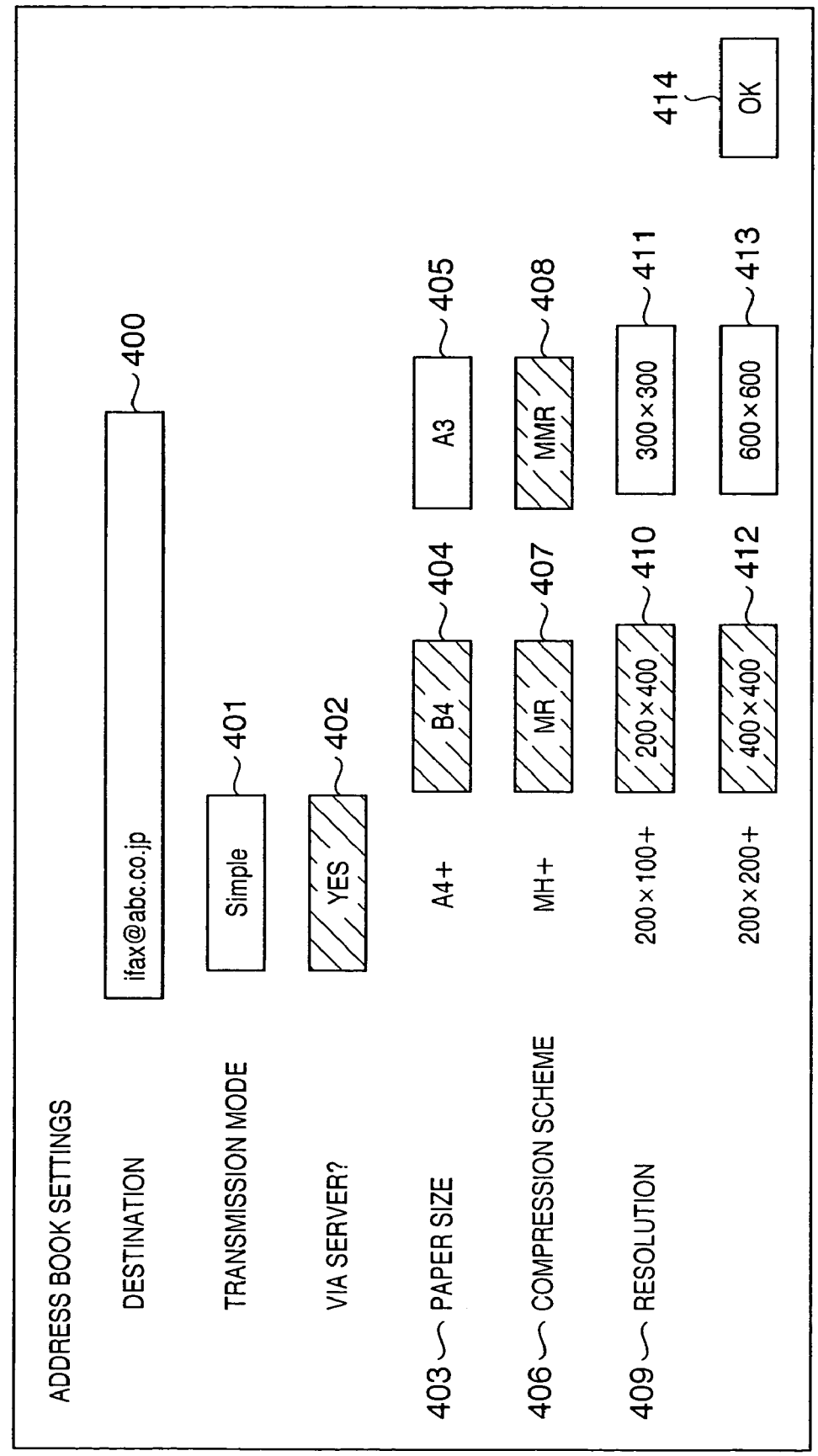
FIG. 10 is a diagram illustrating an example of a screen for registering detailed items of an address book.

FIG. 10 is a diagram illustrating an example of a screen for registering detailed items of an address book displayed by pressing the details key 355.

A destination 400 is an area for inputting an e-mail address. If this area is touched, an alphabetic keyboard is displayed and a character string, numerals and symbols, etc., can be entered.

A switch 401 is for setting either the simple mode or full mode as the transmission mode. This mode makes it possible to select transmission in the simple mode, in which confirmation of delivery is not performed, and transmission in the full mode, in which confirmation of delivery is requested. Whenever this switch is pressed, the mode toggles between the simple mode and the full mode.

A switch 402 is for setting whether data is to be transmitted via an e-mail server such as the mail server 103 or directly without the intervention of an e-mail server. Whenever the switch 402 is pressed, the setting toggles in a manner similar to that of the switch 401.

A switch 403 is for setting the paper size that can be used by the receiver. If the receiver is capable of receiving an image of size B4, then B4 in an area 404 is turned ON; if the receiver is capable of receiving an image of size A3, then A3 in an area 405 is turned ON. Since size A4 can be received by any machine providing it has an Internet fax function, this size is always in the ON state.

A switch 406 is for setting an image compression scheme. Here MR in an area 407 is turned ON in a case where an image that has been compressed by the MR-format compression scheme can be received by the receiver, and MMR in an area 408 is turned ON in a case where an image that has been compressed by the MMR-format compression scheme can be received by the receiver. Since an image that has been compressed by the MH compression scheme can be received by any receiver, this compression scheme is always in the ON state.

A switch 409 is for setting the capability (resolution) of an image that can be received by the receiver. Here 200×400 in an area 410 is turned ON if an image having a resolution of 200×400 dpi can be received by the receiver, 300×300 in an area 411 is turned ON if an image having a resolution of 300×300 dpi can be received by the receiver, 400×400 in an area 412 is turned ON if an image having a resolution of 400×400 dpi can be received by the receiver, and 600×600 in an area 413 is turned ON if an image having a resolution of 600×600 dpi can be received by the receiver. Since images having resolutions 200×100 dpi and 200×200 dpi can be received by any receiver providing it has an Internet fax function, these resolutions are always in the ON state.

It should be noted that the switches 403, 405, 407, 408, 410, 411, 412 and 413 become highlighted in black when they attain the ON state and toggle between ON and OFF whenever they are pressed. Further, if an OK key at 411 is pressed, the content that has been set is registered in the address book.

(Flow of Mail Transmission)

Figure 11:
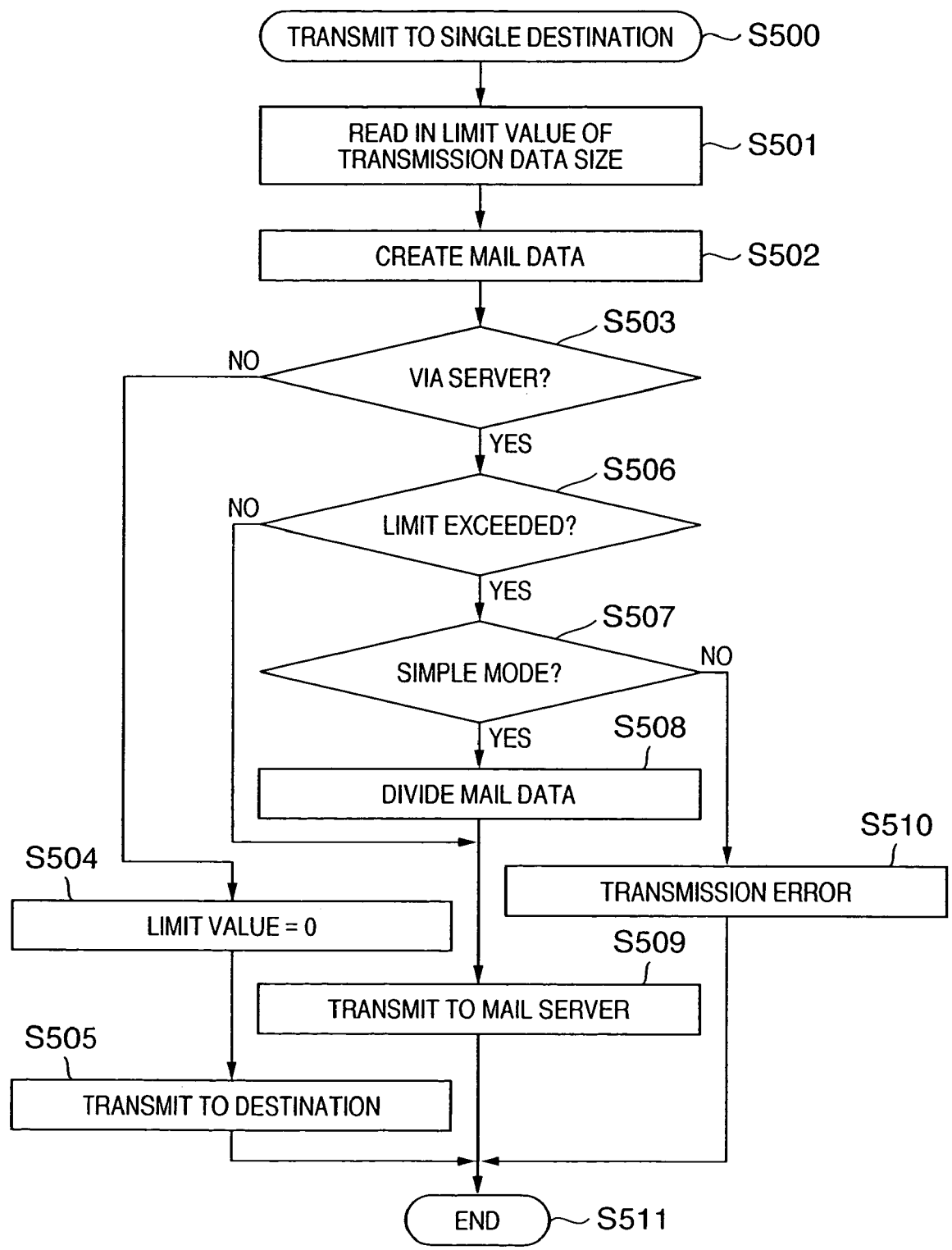
FIG. 11 is a flowchart illustrating operation when e-mail is transmitted to one destination.

FIG. 11 is a flowchart illustrating operation when e-mail is transmitted to one destination.

It should be noted that if a broadcast transmission, in which a transmission is made to a plurality of destinations simultaneously, has been specified, then the processing sequence illustrated below will be executed for every destination.

When a transmission operation starts, processing undergoes a transition to transmission to a single destination (step S500).

When an e-mail server handles data of a large data size (data volume), processing speed declines and, in a worst-case scenario, there is the possibility that the server function will cease, as described earlier. In order to prevent this from occurring, this embodiment is such that a limit value that limits the size of the transmit data in one-megabyte units can be set at the control panel 133 in the user mode in such a manner that data of a size that exceeds a prescribed data size (data volume) will not be transmitted. The data-size limit value that has been set in the user mode is read in (step S501).

If zero has been set as the limit value, then this is interpreted as meaning that there is no limit. Further, a similar effect is obtained even if it is so arranged that a value that has been registered with the e-mail server as this limit value is set by being acquired from the e-mail server during SMTP communication.

An image that has been read by the scanner or an image that has been received by the FAX or IFAX receive function is converted to TIFF image data, this data is subjected to BASE 64 encoding processing and an e-mail header is appended to create e-mail data (step S502).

The state of the switch 402 corresponding to a transmission destination set in the address book is investigated to determine whether a server is to intervene or not (step S503).

If the setting is such that a server will not intervene, then the limit value is made zero (no limit) (step S504) regardless of the limit value read in at step S501, the mail data created at step S502 is transmitted directly to the transmission destination (step S505) and processing is exited (step S511).

If intervention by a server has been set at step S503, on the other hand, then it is determined (step S506) whether the size of the data created at step S502 exceeds the limit value read in at step S501. If the data size does not exceed the limit value, then the data created at step S502 is transmitted to the mail server (step S509) and processing is exited (step S511).

If it is found at step S506 that the size of the data exceeds the limit value, then it is determined whether the switch 401 indicating the transmission mode of every destination set in the address book has been set to the simple mode (step S507). If the mode is the full mode and not the simple mode, then, when a divided transmission is performed, a plurality of delivery confirmations will be required. A transmission error (step S510) is construed, therefore, and processing is exited (step S511).

If it is found at step S507 that the mode is the simple mode, then the mail data is divided into a plurality of segments (step S508) in such a manner that the limit value read in at step S501 will not be exceeded, the data is transmitted to the mail server (step S509) and processing is exited (step S511).

It should be noted that the processing for dividing the mail data at step S508 may be in accordance with the scheme described in RFC 2046 (according to which an image file corresponding to a document is divided based upon data size irrespective of page breaks) or may be processing for dividing and transmitting mail data in page units (according to which an image file corresponding to a document is divided at the page breaks so that the e-mail data of one e-mail will not exceed a limit value).

Further, it is mentioned in this embodiment that the limit value in a case where a server does not intervene is fixed at zero (no limit). However, if the user inputs a limit value in the user mode from the control panel 133 in a case where a server will not intervene and this value is set, then a similar effect will be obtained even if mail data is divided and transmitted in accordance with this limit value or even if a transmission error occurs.

In this case, processing similar to that of steps S506, 507, 508, 510, etc., is executed at step S504 in the flowchart of FIG. 11 in accordance with the limit value for when there is no intervention by a mail server.

Further, it is preferred that the limit value set here be a value larger than that in a case where a mail server intervenes.

In accordance with this embodiment, as described above, a communication apparatus for sending and receiving images using an e-mail protocol is equipped with a switch for setting, in an address book that is for managing transmission destinations, whether or not mail data is to be transmitted via a mail server. As a result, the load on a mail server can be suppressed by setting an upper-limit value on the size of transmission data to a destination for which the mail server intervenes. For a destination to which a transmission can be made without the intermediary of a mail server, the data can be sent to this destination directly regardless of the data size.

Accordingly, when information is registered in an address book, merely setting in advance whether a mail server is to intervene or not makes it possible to set the size of data to be transmitted at one time to a different value. The load on the mail server can be mitigated without the operator performing a complicated operation whenever image data is transmitted.

Second Embodiment

A second embodiment of a communication apparatus according to the present invention will now be described. Components similar to those of the first embodiment need not be described. This embodiment will be described centering on its characterizing features. The second embodiment is a communication apparatus similar to that of the first embodiment but differs from the first embodiment in that the maximum size of transmit data can be set for every destination.

(Address Book Display Screen)

Figure 12:
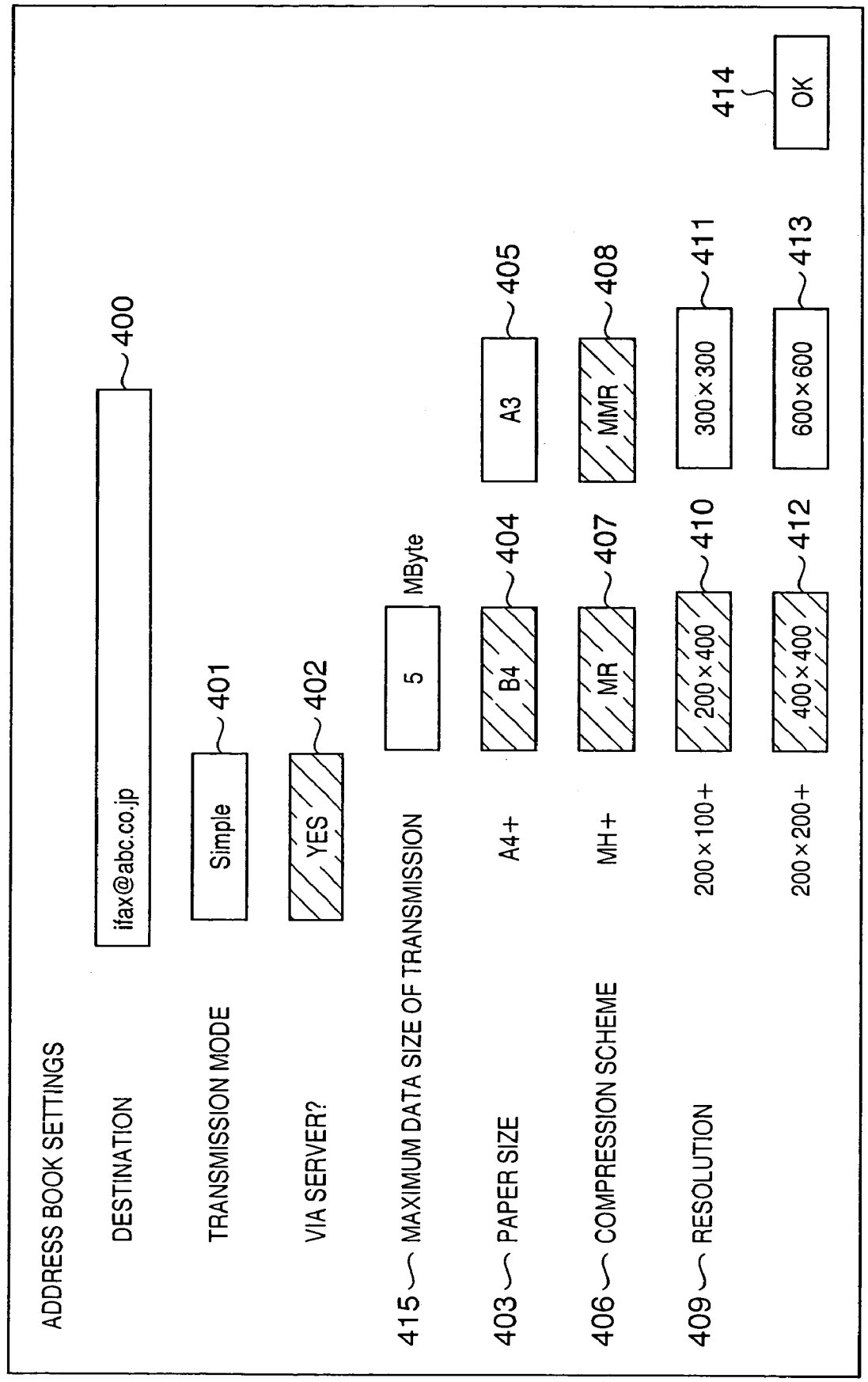
FIG. 12 is a diagram illustrating an example of a screen for registering detailed items of an address book according to a second embodiment of the present invention.

FIG. 12 is a diagram which, in a manner similar to that of FIG. 10, illustrates an example of a screen for registering detailed items in an address book according to a second embodiment of the invention. Information concerning destinations of Internet fax and e-mail is stored is the address book.

If the screen of FIG. 12 is compared with that of FIG. 10 described in connection with the first embodiment, it will be appreciated that this screen differs in that an area 415 for entering the maximum size of transmit data has been added.

The maximum size of transmit data is set by numerals entered in the area 415. The setting is made in single-megabyte units and it is possible to change the maximum size of the transmit data on a per-destination basis.

By way of example, assume that the capacity limit of the mail server 103 is 5 MB and that of the mail server 120 is 3 MB. If e-mail is transmitted from the MFP 100 (mail address ifax@copy1.xyz.co.jp) to the personal computer 104 (mail address syain1.@xyz.co.jp), the mail will be transmitted via the mail server 103 and therefore the capacity limit will be set to 5 MB in conformity with the mail server 103.

If e-mail is to be transmitted to the Internet fax 122 (mail address ifax@abc.co.jp), then the mail will be transmitted via the mail server 103 and mail server 120 and therefore the capacity limit will be set to 3 MB in conformity with the mail server 120.

Accordingly, by setting 5 MB as the maximum transmitted data size 415 in a case where the address-book destination 400 is syain1.@xyz.co.jp (personal computer 104) and setting 3 MB as the maximum transmitted data size 415 in a case where the address-book destination 400 is ifax@abc.co.jp (Internet fax 122), it can be so arranged that mail data that exceeds the capacity limit will not be transmitted with regard to each destination.

(Flow of Mail Transmission)

Figure 13:
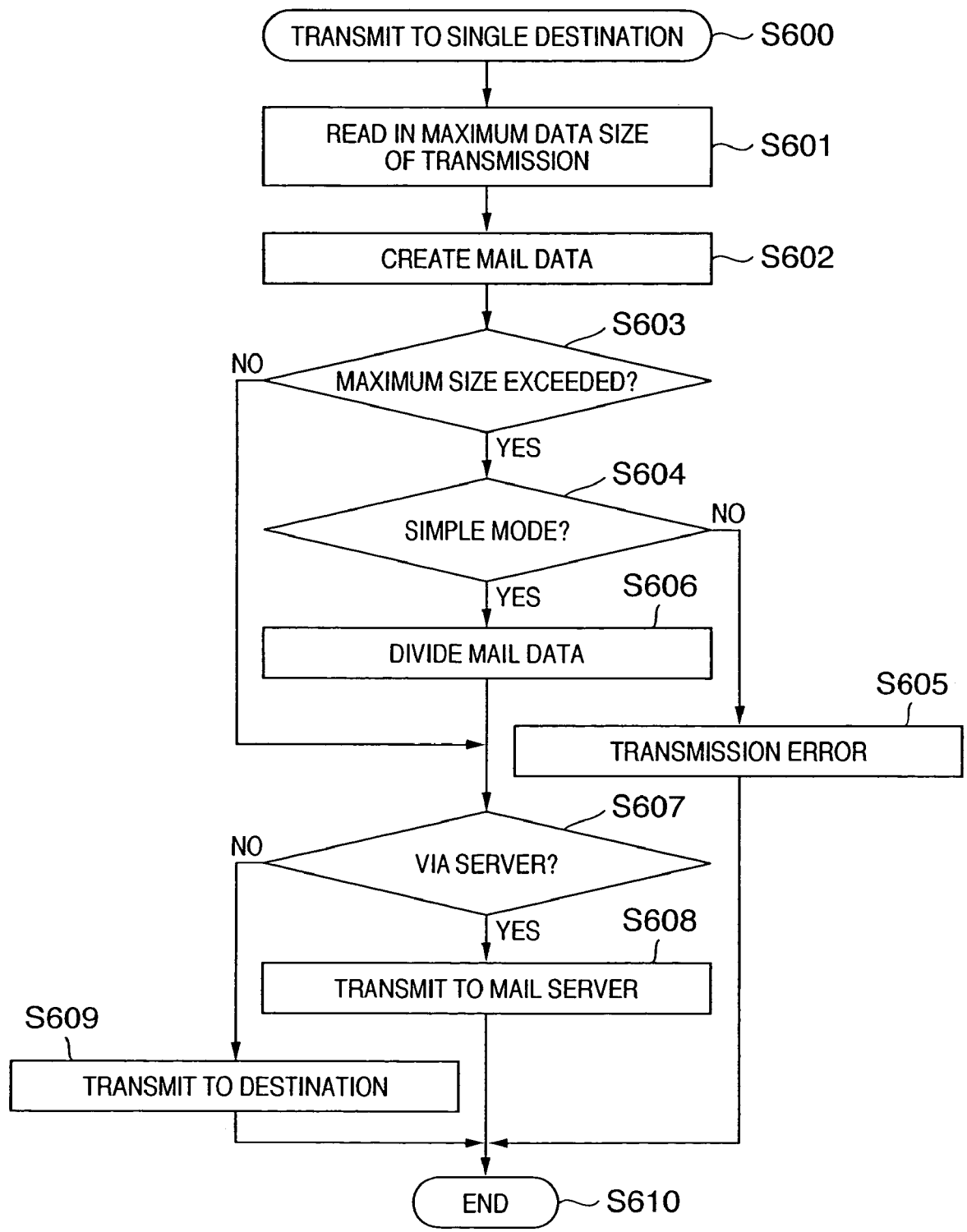
FIG. 13 is a flowchart illustrating operation when e-mail is transmitted to one destination according to the second embodiment.

FIG. 13 is a flowchart illustrating operation when e-mail is transmitted to one destination according to the second embodiment.

It should be noted that if a broadcast transmission, in which a transmission is made to a plurality of destinations simultaneously, has been specified, then the processing sequence illustrated below will be executed for every destination.

When a transmission operation starts, processing undergoes a transition to transmission to a single destination (step S600).

Next, the value in the area 415 of maximum transmitted data size set in the address book described above with reference to FIG. 12 is read (step S601).

An image that has been read by the scanner or an image that has been received by the FAX or IFAX receive function is converted to TIFF image data, this data is subjected to BASE 64 encoding processing and an e-mail header is appended to create e-mail data (step S602).

The mail data created is compared with the data size read in at step S601 and it is determined whether the mail data created has exceeded the maximum transmission size (step S603). Control proceeds to step S607 if the mail data created has not exceeded the maximum transmission size.

If it is determined at step S603 that the mail data created has exceeded the maximum transmission size, on the other hand, then it is determined whether the switch 401 indicating the transmission mode of every destination set in the address book has been set to the simple mode (step S604). If the mode is the full mode and not the simple mode, then, when a divided transmission is performed, a plurality of delivery confirmations will be required. A transmission error (step S605) is construed, therefore, and processing is exited (step S610).

If it is found at step S604 that the mode is the simple mode, then the mail data is divided into a plurality of segments (step S606) in such a manner that the maximum transmission size read in at step S601 will not be exceeded (step S606).

The state of the switch 402 corresponding to a transmission destination set in the address book is investigated to determine whether a server is to intervene or not (step S607).

If the setting is such that a server will not intervene, then the mail data created at step S602 is transmitted directly to the transmission destination (step S609) and processing is exited (step S610).

If intervention by a server has been set at step S607, then the mail data is transmitted to the mail server (step S608) and processing is exited (step S610).

In accordance with this embodiment, as described above, the maximum data size of a transmission can be set for every destination in an address book and it can be so arranged that image information having a size that conforms to the mail server used is sent for every destination.

In this embodiment, it is so arranged that mail data is divided in accordance with a limit value irrespective of whether a mail server intervenes or not. However, as in the first embodiment, it may be arranged so that a limit value is eliminated if a mail server does not intervene or so that a limit value is made a prescribed value in a case where no mail server intervenes.

Other Embodiments

In the above embodiments, an example in which image data is made the attached file is described. However, this does not impose a limitation upon the invention and it is possible to employ e-mail data of various forms.

Further, the foregoing embodiments are described only in regard to a communication apparatus composed of a single device. However, functions equivalent to those of the communication apparatus of this invention may be implemented by a system comprising a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

If the present invention is realized as a storage medium, program codes corresponding to at least one of the above mentioned flowcharts (FIGS. 4, 5, 6, 7, 11 and FIG. 13) is to be stored in the storage medium.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-333447 filed on Sep. 25, 2003, which is hereby incorporated by reference herein.

What is claimed is:

1. A communication apparatus having a transmission unit, which transmits e-mail data, comprising:
an e-mail data generating unit which generates e-mail data;
a selecting unit which selects whether or not to use a mail server when the generated e-mail data is transmitted;
a dividing unit which divides the generated e-mail data; and
a controller which a) exercises control in such a manner that if a data size of the generated e-mail data exceeds a predetermined size and in a case where it is selected by the selecting unit to use the mail server, then the generated e-mail data is transmitted by said transmission unit upon being divided by said dividing unit, and
b) exercises control such that the generated e-mail data is transmitted by said transmission unit without being divided by said dividing unit even if the data size of the generated e-mail data exceeds the predetermined size, in a case where it is selected by the selecting unit not to use the mail server.

2. The apparatus according to claim 1, further comprising a transmission-destination information registration unit which registers various information including whether or not to use a mail server, on a per-transmission-destination basis,
wherein said selecting unit performs the selection in accordance with content that has been registered in said transmission-destination information registration unit.

3. The apparatus according to claim 2, wherein said transmission-destination information registration unit registers the predetermined size on a per-transmission-destination basis, and
said dividing unit divides the generated e-mail data by determining, after a transmission destination has been decided, whether the data size of the generated e-mail data exceeds the predetermined size corresponding to the decided transmission destination.

4. The apparatus according to claim 2, wherein said transmission-destination information registration unit registers, on a per-transmission-destination basis, whether the generated e-mail data will be transmitted in a first transmission mode in which confirmation of delivery is performed, or in a second transmission mode in which confirmation of delivery is not performed, and
when it has been determined that the data size of the generated e-mail data exceeds the predetermined size, said controller suspends transmission of the generated e-mail data if the mode for the transmission is the first transmission mode.

5. The apparatus according to claim 1, wherein said e-mail data generating unit generates e-mail data having image data as an attached file.

6. The apparatus according to claim 5, wherein the image data is facsimile image data.

7. A method of controlling a communication apparatus having an e-mail transmitting function, comprising:
an e-mail data generating step of generating e-mail data;
a selection step of selecting whether or not to use a mail server when the generated e-mail data is transmitted;
a dividing step of dividing the generated e-mail data;
a first transmitting step of transmitting the generated e-mail data, upon dividing the generated e-mail data at said dividing step, if a data size of the generated e-mail data exceeds a predetermined size and it is selected by the selecting step to use the mail server; and
a second transmitting step of transmitting the generated e-mail data, without dividing the generated e-mail data at said dividing step, even if the data size of the generated e-mail data exceeds the predetermined size, in a case where it is selected by the selecting unit not to use the mail server.

8. A computer-readable storage medium storing a computer program to be executed by a communication apparatus having an e-mail transmitting function, said program including program code that, when executed, performs the following steps:

an e-mail data generating step of generating e-mail data;

a selecting step of selecting whether or not to use a mail server when the generated e-mail data is transmitted;

a dividing step of dividing the generated e-mail data;

a first transmitting step of transmitting the generated e-mail data, upon dividing the generated e-mail data at said dividing step, if a data size of the generated e-mail data exceeds a predetermined size and it is selected by the selecting step to use the mail server; and a second transmitting step of transmitting the generated e-mail data, without dividing the generated e-mail data at said dividing step, even if the data size of the generated e-mail data exceeds the predetermined size, in a case where it is selected by the selecting step not to use the mail server.

9. A communication apparatus having a transmission unit which transmits e-mail data, comprising:

an e-mail data generating unit which generates e-mail data;

a selecting unit which selects whether or not to use a mail server when the generated e-mail data is transmitted;

a first registration unit which registers a first data-size limit value that is used in a case where it is selected by the selecting unit to use the mail server;

a second registration unit which registers a second data-size limit value that is used in a case where it is selected by the selecting unit not to use the mail server;

a dividing unit which divides the generated e-mail data if the data size of this the generated e-mail data exceeds the first data-size limit value or the second data-size limit value; and a controller which a) exercises control in such a manner that when the data size of the generated e-mail data exceeds the first data-size limit value and in a case where it is selected by the selecting unit to use the mail server, the generated e-mail data is transmitted by said transmission unit upon being divided by said dividing unit, and b) exercises control such that when the data size of the generated e-mail data exceeds the second data-size limit value; and in a case where it is selected by the selecting unit not to use the mail server, the generated e-mail data is transmitted by said transmission unit upon being divided by said dividing unit.

10. The apparatus according to claim 9, further comprising a transmission-destination information registration unit for registering various information, which includes whether or not to use a mail server, on a per-transmission-destination basis, wherein said selecting unit performs the selection in accordance with content that has been registered in said transmission-destination information registration unit.

11. The apparatus according to claim 10, wherein said transmission-destination information registration unit registers the first data-size limit value on a per-transmission-destination basis.

12. The apparatus according to claim 10, wherein said transmission-destination information registration unit registers, on a per-transmission-destination basis, whether the generated e-mail data will be transmitted in a first transmission mode in which confirmation of delivery is performed, or in a second transmission mode in which confirmation of delivery is not performed, and when it is determined that the data size of the generated e-mail data exceeds the first or second data size limit, said controller suspends transmission of the generated e-mail data that is divided by said dividing unit if the mode for the transmission is the first transmission mode.

13. The apparatus according to claim 9, wherein said e-mail data generating unit generates e-mail data having image data as an attached file.

14. The apparatus according to claim 13, wherein the image data is facsimile image data.

15. A method of controlling a communication apparatus having an e-mail transmitting function, comprising:

an e-mail data generating step of generating e-mail data;

a selecting step of selecting whether or not to use a mail server when the generated e-mail data is transmitted;

a first registration step of registering a first data-size limit value that is used in a case where it is selected by the selecting steps to use the mail server;

a second registration step of registering a second data-size limit value that is used in a case where it is selected by the selecting step not to use the mail server;

a dividing step of dividing the generated e-mail data if data size of the generated e-mail data exceeds the first data-size limit value or the second data-size limit value;

a first transmitting step of transmitting the generated e-mail data, upon dividing the generated e-mail data at said dividing step, when the data size of the generated e-mail data exceeds the first data-size limit value and in a case where it is selected by the selecting step to use the mail server; and a second transmitting step of transmitting the generated e-mail data, upon dividing the generated e-mail data at said dividing step, when the data size of the generated e-mail data exceeds the second data-size limit value and in a case where it is selected by the selecting step not to use the mail server.

16. A computer-readable storage medium storing a computer program to be executed by a communication apparatus having an e-mail transmitting function, said program including program code that, when executed, performs the following steps:

an e-mail data generating step of generating e-mail data;

a selecting step of selecting whether or not to use a mail server when the generated e-mail data is transmitted;

a first registration step of registering a first data-size limit value that is used in a case where it is selected by the selecting step to use the mail server;

a second registration step of registering a second data-size limit value that is used in a case where it is selected by the selecting step not to use the mail server;

a dividing step of dividing the generated e-mail data if the data size of the generated e-mail data exceeds the first data-size limit value or the second data-size limit value;

a first transmitting step of transmitting the generated e-mail data, upon dividing the generated e-mail data at said dividing step, when the data size of the generated e-mail data exceeds the first data-size limit value and in a case where it is selected by the selecting step to use the mail server; and a second transmitting step of transmitting the generated e-mail data, upon dividing the generated e-mail data at said dividing step, when the data size of the generated e-mail data exceeds the second data-size limit value and in a case where it is selected by the selecting step not to use the mail server.

\* \* \* \* \*